United States Patent [19]

Simmonds

[11] 3,882,287

[45] May 6, 1975

[54] METHOD AND APPARATUS FOR DETECTING FAULTS AND LOCATING CONDUCTORS IN MULTI-CONDUCTOR CABLES

[75] Inventor: James F. Simmonds, Sherman Oaks, Calif.

[73] Assignee: Perkins Research & Mfg. Co., Canoga Park, Calif.

[22] Filed: Apr. 20, 1973

[21] Appl. No.: 353,210

[52] U.S. Cl. .............. 179/175.3 A; 324/66; 328/138

[51] Int. Cl. .............. H04b 3/46

[58] Field of Search .............. 179/175.3 A; 324/66; 330/109; 325/465, 463; 328/138

[56] References Cited

UNITED STATES PATENTS

| | | | |
|---|---|---|---|
| 2,232,833 | 2/1941 | Wilhelm | 325/489 |
| 3,049,682 | 8/1962 | Waring | 325/489 |
| 3,252,087 | 5/1966 | Parke | 324/66 |
| 3,638,038 | 1/1972 | Weber | 328/138 |
| 3,644,687 | 2/1972 | Richards | 179/175.3 A |
| 3,673,512 | 6/1972 | Walters | 330/109 |
| 3,681,686 | 8/1972 | Connally | 179/175.3 A |
| 3,696,252 | 10/1972 | Chapman | 328/138 |

*Primary Examiner*—Kathleen H. Claffy
*Assistant Examiner*—Douglas W. Olms
*Attorney, Agent, or Firm*—Miketta, Glenny, Poms & Smith

[57] ABSTRACT

Detecting faults and identifying conductor parts multi-conductor telephone cables is many times necessary in the maintenance of a telephone communication system. The disclosed method and apparatus for this purpose includes a tone generator for connection to a telepone conductor pair at a first location of a cable and a receiver unit having a frequency tunable amplifier, a signal detection pickup coil or probe, and a headset connected to the tunable amplifier for use at a remote cable location to detect tones imposed on the pair at the first location. The method utilizes a tone generator which has a nominal signal frequency for use at the first cable location in conjunction with a pair of cable wires. The receiving unit is temporarily coupled to the wires at the first location so that the amplifier may be tuned to the precise frequency generated by the tone producing device. The receiving unit is then carried to the remote cable position and the probe or pick-up coil is used to sense the presence of signals generated. Because the amplifier has been tuned to the precise frequency of the signal provided by the tone generator, even weak signals may be detected in the presence of considerable interference from external source. A threshold circuit is provided at the output of the tunable amplifier to enable rejection of low level interference signals and to further improve the resolution of the detection equipment.

7 Claims, 3 Drawing Figures

METHOD AND APPARATUS FOR DETECTING FAULTS AND LOCATING CONDUCTORS IN MULTI-CONDUCTOR CABLES

BACKGROUND AND PRIOR ART:

In telephone communication systems, the instruments or other apparatus are electrically connected through multi-conductor cables which are generally elevated or buried and thus not conveniently accessible. These cables may comprise numerous individually plastic-insulated or paper insulated copper wires which are grouped into pairs by spirally winding one wire of the pair around its mate. A complete set of group of such pairs is then encased in an outer sheath which may be metallic shielded. The sheath may be grounded at various points throughout the system to prevent stray voltages and currents from influencing the conductors.

In maintenance of a telephone system, the multiconductor cables or the conductors disposed therein may develop what is commonly known as "faults" which is a generic term that identifies various types of difficulties that prevent signals from being properly transmitted along the cable pair. In practice, repair of the system requires location of such faults; but these are not readily visually detectable since they may be entirely internal of the cable sheath.

One method which has been devised in the past to locate faults is by a process commonly referred to as "coiling." This method consists of placing a low frequency tone or signal on the faulty conductor and then tracing or detecting the presence of the signal starting from the location at which the signal is imposed on the pair and traveling away from the source until the signal disappears. By an interpolating process, the precise location of the fault is detected.

This technique enables the location of such faults as shorted pairs, grounded pairs, split pairs and crossed pairs. The signal or tone applied to the faulty pair travels along one leg to the point of the fault and returns along the other leg of the conductor pair. The electrical current representing the applied signal creates a magnetic field, and it is the presence or absence of this field which enables the pin-pointing of the fault location. The pick-up coil is capable of sensing or detecting the magnetic field associated with the tone current and by moving the coil along the cable it is possible to locate the cable position at which the magnetic signal disappears.

In the case of split pairs, the pick-up coil may be employed to locate the cable position at which the split occurs. At one end of the cable, the tone source is applied to the split pair, while at the other cable end a short is placed across the conductors of the split pair to complete the circuit. In those sections of the cable where the pair are closely intertwined, the pick-up coil senses only a very low level tone; whereas cable sections in which the pair have separated, i.e., "split" into spaced apart conductors, the received tone is at a high level. By monitoring the relative high and low levels sensed by the pick-up coil, the precise cable location at which the split occurs is determined.

Although this technique works well for strong signals, many times the detectable signal created by the surrounding magnetic field is so weak that the receiving apparatus is unable to resolve the desired tone signal from other interfering signals. This is true even though the signals picked up by the coil are amplified and applied in audible form to an ear-phone or speaker. This difficulty in resolving the test signal in the presence of stray and interference signals may be attributed to the lack of sensitivity of prior art equipment. Typically, a tone generator having a nominal frequency of approximately 500 Hertz is employed, but the precise frequency varies from instrument to instrument. Accordingly, prior art amplifiers employed in the receiving units are required to be sensitive to a range or band of frequencies around the nominal tone generator frequency, such as 500 Hertz, to enable the receipt of signals from any of the frequency generators, even though its frequency is not exactly set at 500 Hertz. By constructing the amplifier of the receiver to accommodate the band of frequencies, rather than a precise frequency of known value, the resolution of the system is substantially restricted, and the interference from stray signals becomes a critical limitation in the ability to locate the fault.

Another function of this type of detecting equipment is to locate and identify un-marked wire conductors at one or the other end of the multi-conductor cable. This function is accomplished by applying a low frequency tone to one or more separate conductors of the bundle at one end of the cable, or to a point at which the separate conductors are accessible. The tone may be applied, for example, across one conductor and ground, which may be provided by the metallic sheath of the cable. Alternatively, the return path may be provided by one of the conductors of the cable, in which case the tone source and receiving unit have one of their terminals connected via this common conductor. However, the more typical procedure is to utilize ground to complete the signal path.

Then, by using an electrical probe, which may be a pointed conductive member connected to a tone receiving unit, the various exposed conductors at a remote location on the cable may be sensed for the applied tone. The conductor to which the tone has been applied at the other end of the cable will produce an audible tone when contacted by the probe at the remote cable end. This process is referred to as "probing."

By amplifying the probe signal, it is possible to produce an audible tone when the probe is merely moved into proximity with the test conductor, even though the probe does not actually make electrical contact with the wire. In such case, the tone or signal applied to the conductor or conductors is capacitively coupled to the probe, and with amplification, the probe can be guided to the conductor in question by monitoring an increasing level of the received tone.

Amplifiers are presently available for individually accomplishing these two tasks, namely "coiling" and "probing". However, in the case of "coiling," weak signals and/or interfering signals many times prevent locating the fault because of the aforementioned lack of resolution of the amplifier. One type of amplifier presently available has been addressed to this specific problem and provides an improved resolution by employing a specific tone source matched to the response of the amplifier. However, such equipment is not capable of satisfactorily performing the function of "probing." This means that the craftsman must carry two tone sources and two amplifiers, one set for each function required.

Accordingly, it would be desirable to provide a receiving unit having a amplifier capable of optimum operation and high resolution in performing both the functions of "coiling" and "probing". It is also desirable to provide such a receiving unit which is capable of accommodating, or co-operating with any of the numerous tone generators which might be available in the field.

SUMMARY OF THE INVENTION:

In light of the above-described difficulties and disadvantages of the prior art apparatus and methods, it is an object of the present invention to provide a method and apparatus for signal detection to enable the detection of faults in multiconductor telephone cables wherein the amplifier used in conjunction with the detecting probe may be tuned to the precise frequency of the tone generator for "coiling" and wherein the same amplifier provides optimum performance in "probing."

Generally, the present invention comprises a method and apparatus for detecting faults in multi-conductor cables such as used in telephone systems, and includes a tone generator for connection to a telephone pair at a first cable location, and a receiver unit including a frequency tunable amplifier, a signal detection pick-up probe or coil and a headset connected to the output of the tunable amplifier for use at a cable location remote from the first. The method includes the steps of connecting a tone generator having a frequency approximating a certain nominal frequency tone to a cable pair at a first location, temporarily coupling the tunable frequency amplifier to the conductor pair adjacent the first location, and tuning the amplifier frequency to the precise frequency of the tone. Thereupon, the method requires decoupling the tunable frequency amplifier and positioning a pick-up coil connected to an input of the amplifier adjacent a telephone cable at a location remote from the first location, and detecting the presence or absence of the signal at such remote location.

Apparatus is provided to carry out this method in the form of a receiving unit to which the pick-up coil or probe may be connected and including a tunable frequency amplifier for applying an audible tone to a speaker or ear phones in response to the detection of the applied tone signal to the cable pair. To facilitate the tuning of the amplifier it includes a first stage for effecting a coarse tuning to the particular tone generator employed, and a second stage for fine tuning of the amplifier. Moreover, the second stage may be temporarily and selectively converted to a straight gain stage during tuning of the first amplifier stage, and thereafter re-converted to a tunable frequency amplifier stage for completing the fine tuning.

Additionally, the tunable amplifier of the receiving unit may include a gain control which is particularly adapted to accommodate both the functions of "coiling" and "probing." Additionally, a threshold circuit stage may be provided between the output of the tunable amplifier and the headset or speaker at the output of the receiving unit to exclude un-desired and low level interference signals which otherwise obscure the test tone signal.

By the use of such apparatus the receiving unit can be quickly and easily adjusted to provide optimum performance, regardless of the particular tone generator employed. Moreover, the equipment can be adjusted prior to each test such that the affects of variations in the frequency of either the tone generator or in the receiving amplifier can be controlled so that optimum testing performance is always available.

These and further objects and various advantages of the method and apparatus for detecting faults and locating conductors in multi-conductor cables according to the present invention will become apparent to those skilled in the art from a consideration of the following description of an exemplary embodiment thereof.

BRIEF DESCRIPTION OF THE DRAWINGS:

Reference will be made to the appended sheets of drawings in which:

FIG. I is a diagrammatic illustration of the use of the method and apparatus of the present invention for detection of signals impressed upon conductor pairs of a multi-conductor transmission cable, in which the applied tone signals are developed by a tone generator and the sensing of the signals is by the technique of "coiling."

Figures 1, 2:
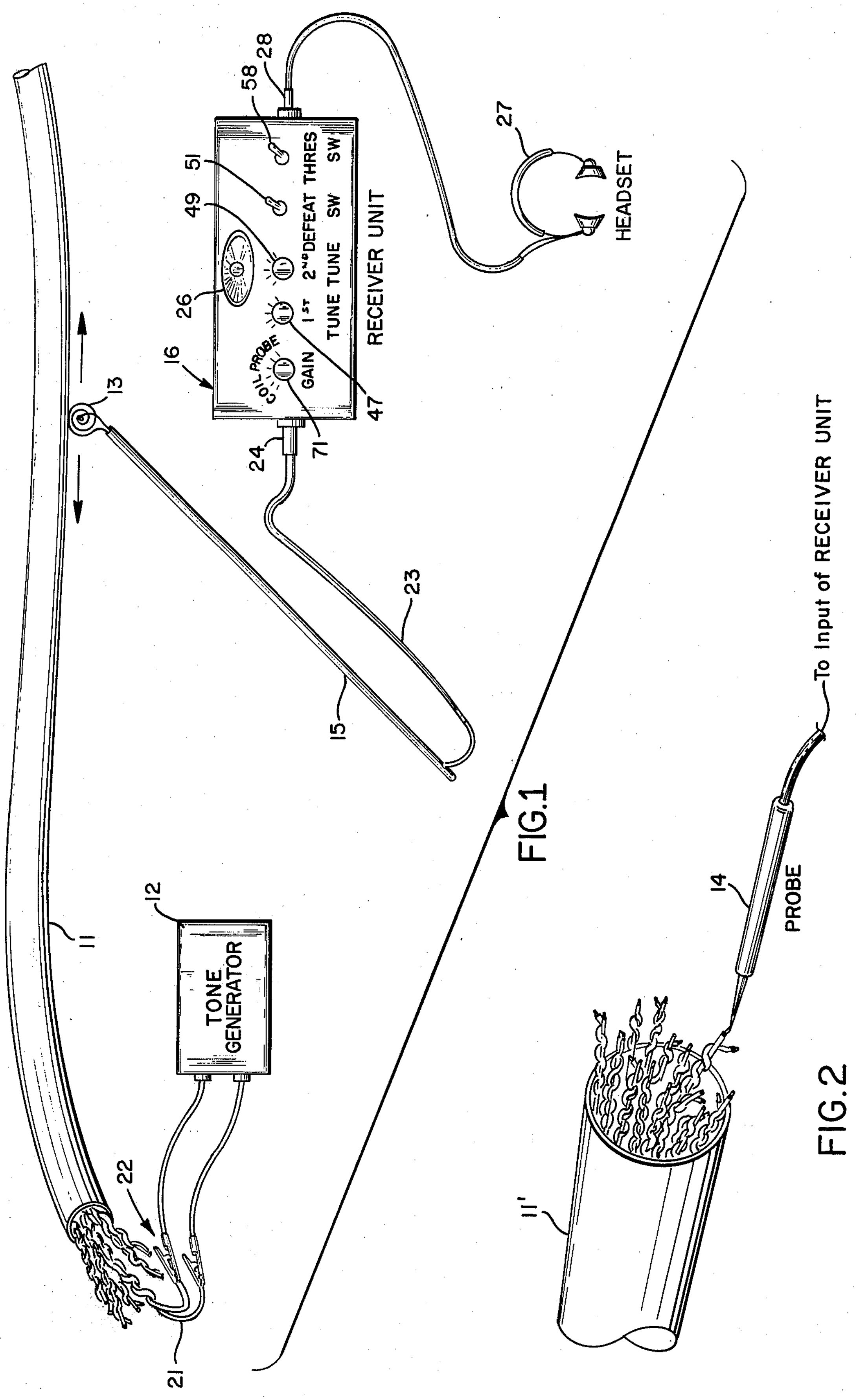
Figure 3:
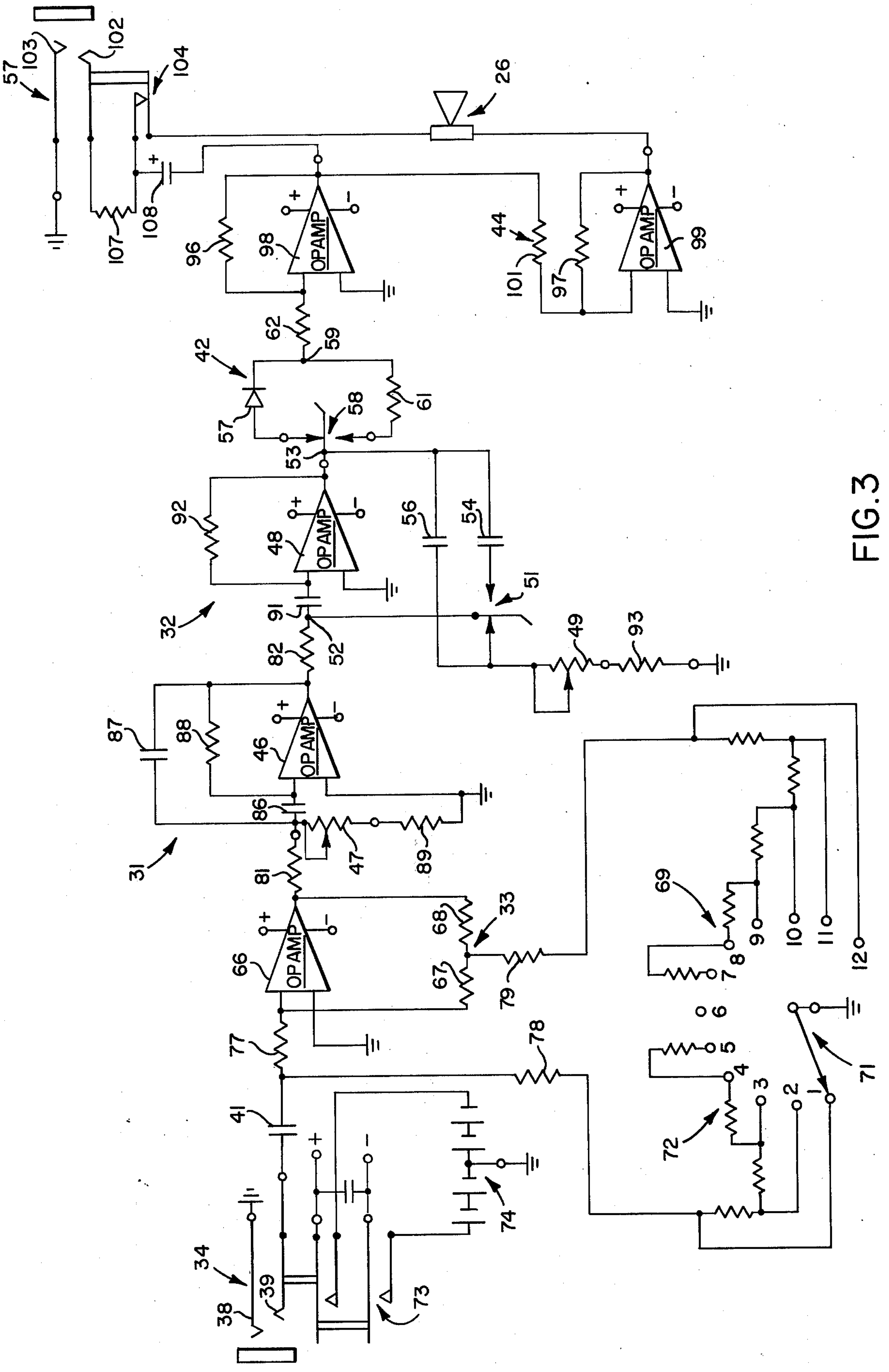

FIG. II is another diagramatic illustration of the method and apparatus of the present invention for use in locating and identifying conductor pairs of a telephone transmission cable by the process of "probing".

FIG. III is a detailed circit diagram of the receiver unit including a frequency tunable amplifier for use in the "coiling" and "probing" operations.

DESCRIPTION OF AN EXEMPLARY EMBODIMENT:

Referring now to the drawings, there is shown in FIG. I an exemplary apparatus constructed in accordance with the present invention for use in detecting faults in telephone transmission cables and for locating and identifying the individual conductors of a multi-conductor transmission cable. In general, the present invention is an improvement on the known process of applying a tone or other low frequency signal to certain conductors of multi-conductor transmission cable 11 and sensing or receiving the applied signals at a cable location remote from the point of origin. In FIG. I, the applied signal is developed in a tone generator 12 having clip leads 13 for electrical attachment to certain conductors of cable 11, and the applied tone signal is sensed by means of a pick-up coil 13 scanning the exterior of cable 11 for the magnetic field produced by the applied tone signal. In FIG. II, an electrical pick-up probe 14 is employed for receiving the applied tone signal, in which the probe may either physically contact the conductor pairs to determine the presence or absence of the applied tone, or the applied tone may be sensed by mere proximity of the probe to the energized conductor.

In both cases, the output of either the pick-up coil 13 is applied to an input of a receiver unit 16, the output of which is equipped with suitable transducer means, such as a loud speaker and/or headset for audibly registering any tone signals which are detected.

Tone generator 12 may be connected to a pair of conductors of cable 11 at a suitable and accessible first location, which may be at a central exchange or station in the telephone network. As one example, and with reference to FIG. I, generator 12 may be connected such that the applied tone travels down one of the conductors of cable 11 to the location of the fault, crosses the fault and returns along the other faulty conductor. The current caused to travel in the wires by this applied tone will generate a magnetic field surrounding cable 11 which may be sensed by pick-up coil 13. In this manner coil 13, which may be mounted at one end of an elongated maintenance pole 15 for overhead cables, may be scanned along the exterior of cable 11 to detect the presence or absence of the tone current therealong. Starting with the end at which tone generator 12 is connected to the conductors, pick-up 13 may be moved downstream of the cable until the signal disappears, indicating the location of the fault.

Coil 13 "picks-up" the tone signal by induction caused by the presence of a magnetic field associated with the traveling tone current. So long as the magnetic field is strong, pick-up coil 13 can develop a strong signal in receiver unit 16, the presence or absence of which can be readily identified by the presence or absence of an audible tone in the speaker or headset. However, many times the magnetic field associated with the applied tone is so weak, that insufficient electrical energy is induced in pick-up coil 13 to enable the craftsman to detect the presence or absence of the test signal at the output transducers of receiver unit 16. The weakness of the induced signal may be due to many causes including the length of cable over-which the applied tone signal must travel to the fault location, the fact that most telephone cables are provided with a metallic or conductive sheath encasing the bundle of individual and paired conductors, etc. Also, the presence of other non-test signals tend to interfere with the applied test tone signal, thus increasing the difficulty of resolving the desired test signal in receiver unit 16.

Similarily, in connection with FIG. 2, electrical pick-up probe 14 may be moved from conductor pair to conductor pair of cable 11′ so as to locate and identify the telephone pair to which a tone signal has been applied at a different cable location. It is a desirable feature of such an electrical pick-up probe to provide sufficient amplification of the signal associated therewith to permit capacitively coupling of the test signal within the cable conductor to the probe. By such capacitive coupling, it is possible to move the tip of the probe into proximity with the various conductor pairs and guide the probe to the desired conductor by sensing an increasing level of the test tone at the output of the receiver unit. In other words, the probe 14 need not physically touch the conductor in question to register a test tone in the receiver unit, and this feature greatly facilitates and speeds the locating and identifying of the conductors. However, as in the case of the "coiling" operation, the ability of the pick-up probe 14 to register test signals depends upon the ability of the receiver unit to resolve weak test tones in the presence of other interfering signals.

At other times, it is desirable to use pick-up probe 14 such that it registers a tone signal only upon physical contact with the energized conductor. In such case, a receiver unit capable of resolving capacitively coupled test signals, would cause an objectionable high intensity audio signal to be applied to the speaker or headset at the moment of contact of the probe with the conductor. Thus, it is desirable to provide a receiver unit 16 capable of accommodating this direct contact test operation as well as providing the high level of gain and sensitivity necessary for the capacitive probing.

In accordance with the present invention, a receiver unit 16 is provided with a frequency tunable amplifier capable of being conditioned to resolve even the weakest "coiling" and "probing" signals. In particular, the tunable amplifier permits the receiver unit to be singularly adapted to each and every tone generator 12 which might be employed in the field. As mentioned above, the conventional tone generators employed as illustrated in FIG. I have a nominal signal frequency of, for example, 500 Hertz. However, in practice, the actual frequency of the tone generators vary from device to device, such that collectively the generators have a frequency which lies in a band or range centered about the nominal frequency. Furthermore, an individual generator may have a frequency which drifts within this band of frequencies, such that even if the exact frequency of a given generator were measured, it cannot reliably be assumed that the same frequency will exist during a later test.

The tunable of receiver unit 16 may be provided as in the present embodiment by first and second frequency tunable amplification stages for conditioning receiver unit, prior to each test, to receive and amplify only the specific frequency of the tone generator in use, and to exclude the un-wanted signals so that the desired tone can be clearly resolved. In this manner, the sensitivity and gain have been significantly increased such that even the weakest signals may be registered during "coiling" and/or "probing". The frequency selection of the tunable amplifier may provide for selection of frequencies in a range adjacent the standard nominal frequency of 500 Hertz, or as in the case of the present embodiment may provide a much broader range of frequency selection from approximately 350 Hertz to 1,000 Hertz. This broader frequency tuning enables the receiver unit 16 to match not only standard generators in which the frequency is close to 500 Hertz, but also permits the use of nonstandard tone generators in which the frequency differs significantly from the more typical 500 Hertz value. One particular embodiment of the apparatus which provides this tunable frequency amplifier, together with other features of the present invention, is shown in FIG. III and will be discussed more fully hereinafter.

Referring again to FIG. I, the method of the present invention generally comprises the following sequence of steps. First, the tone generator 12, which may be one device out of many available in the field, is connected across the two conductors forming a telephone conductor pair 21 of cable 11. The location along cable 11 at which generator 12 is connected, will depend upon the accessability of the conductors, and may be at a cable junction, a broken point in the cable, or at a station or exchange of telephone network. The connection may be made by any suitable detachable means, such as the alligator clips 22 illustrated here. The particular conductors to which generator 12 is connected will depend upon the characteristic of the fault. Here for example, it is assumed that the fault exists in a short somewhere downstream of cable 11 in telephone pair 21.

Pick-up coil 13 is connected to an input of receiver unit 16 by means of an extension cord or cable 23 and a jack 24, for which a compatible receptacle exists within unit 16. The output tone developed by receiver unit 16 may be monitored by an internal speaker 26, and/or by a headset 27, adapted to be worn by the telephone craftsman, and having a jack 28 received by an output jack receptacle mounted on unit 16. Accordingly, pick-up coil 13 forms a pick-up means connectable to the receiving unit 16 in which a tunable amplifier means is provided for developing an audible tone on audio transducer means, here in the form or speaker 26 and/or headset 27, connected at an output of the receiver amplifier.

The next step involves the tuning of the amplifier to the particular tone generator 12 in use. This is accomplished by moving pick-up coil 13 so as to be adjacent the leads connecting generator 12 with telephone pair 21 so as to induce a signal within the pick-up means at the point of origin. If desired, coil 13 or the input to receiver unit 16 may be physically electrically connected to the output of tone generator 12 during this operation. With the close physical connection between the tone generator and the pick-up probe, there is little or no intervening inteference or noise between the receiver and the tone source.

In this condition, the frequency selective amplifier of unit 16 may be tuned precisely to the tone frequency emitted by generator 12, by adjusting the controls described more fully herein, and monitoring the intensity of the audible tone at speaker 26 or headset 27. At maximum signal strength, the frequency of the tunable amplifier of the receiver is accurately matched to the tone generator.

Following the tuning step, pick-up coil 13 may be decoupled from its position adjacent tone generator 12 and removed to a location remote therefrom. The receiver unit 16, pick-up coil 13 and headset 27 are now transported to locations downstream of cable 11 from the origin of the test tone signal to locate the position of the fault. The fault location may be up to many miles downstream of generator 12. To locate its position, the pick-up coil is moved from point to point to detect the presence or absence of the applied tone. These steps are conventional and in general involve moving pick-up coil 13 away from generator 12 along cable 11 in suitable increments until a tone signal is no longer sensed. When this occurs, the craftsman knows that the fault lies between the last location at which a signal was detected and the point at which no signal is sensed. By repeating the foregoing steps in smaller increments it is possible to narrow down and precisely pin point the fault location.

For probing, the amplifier of the receiver unit 16 is tuned to the frequency of the tone generator in a manner similar to the operation discussed above. For this purpose, probe 14 may be connected to the input of unit 16 and positioned in proximity to tone generator 12 for tuning the amplifier to the precise generator frequency. Usually however, the tone signal is sufficiently strong in the case of probing to permit turning of the amplifier at the remote probing location by touching the probe to a conductor known to carry the tone signal. Thus, in such case it is unnecessary to tune the receiving unit at the sending end of the cable. The gain of the amplification may now be adjusted as desired to permit capacitive coupling of probe 14 to the various conductors of the cable, for locating and identifying the conductors to which the generator is connected. The presence of unwanted signals are selectively discriminated against in "probing" by the matched frequency response of the receiver with the tone emitted by generator 12.

By these operations, the amplifier of the receiving means need not be responsive to a band or range of frequencies and thus will not pick up and amplify stray interference signals which tend to mask or obscure the presence or absence of the desired test tone signal.

An important feature of this invention is the provision of a tunable amplifier having first and second tunable stages. With reference to FIG. III this construction is exemplified in the present embodiment by a first tunable amplification stage 31, followed by a second tunable amplification stage 32, both of which are preceeded by a gain control stage 33. Together stages 31, 32 and 33 provide the tunable amplifier means in this embodiment for receiver unit 16, for frequency selective amplification of a pick-up means connected at input jack receptacle 34. The amplified signal is passed to transducer means, herein the form of a loud speaker 36, or the craftsman's headset connectable to jack receptacle 37, both at the output of receiver 16. The signal from the pick-up coil or probe is applied between a grounded or common contact 38 and an input contact 39 of jack receptacle 34, and from there is passed through a blocking capacitor 41, gain control stage 33, through the first and second frequency selective stages 31 and 32, through a threshold level circuit 42 described herein, and through output amplification stages 43 and 44 to either speaker 36 or the headset connected to jack receptacle 37.

With particular reference to the first and second stage tuning feature of this apparatus, stage 31 is an adjustable frequency selective operational amplifier circuit including a operational amplifier 46 and a variable resistance 47 providing the frequency variation or selection. With reference to FIG. I, receiver unit 16 is provided with a first stage tuning control corresponding to variable resistance 47 as indicated. By tuning resistor 47 a relatively coarse band pass is achieved at the output of stage 31 such that only frequencies lying within a certain band or range are amplified and passed downstream of the circuit to the second tuning stage 32.

Stage 32 is also an adjustable, frequency selective operational amplifier circuit including an operational amplifier 48 and a variable resistance 49. A second stage tuning control is provided on the panel of unit 16 as shown in FIG. I for tuning the frequency of this stage by adjusting variable resistor 49. This second stage may have the same or similar band pass as provided by stage 31, however as these stages are cascaded the tuning of the second stage 31 provides a double or series filtering of the signal and thus affords a fine tuning of the frequency selectivity.

Moreover, and as a preferred feature of the present invention, second tuning stage 32 is provided with switching means and circuit means for selectively converting this second stage between a straight gain amplifier circuit and a narrow band frequency selective amplifier circuit. This conversion capability of stage 32 facilitates the tuning of the first stage 31 by temporarily bypassing the frequency selectively of the second stage during the tuning of the first.

In this embodiment, the switching means is provided by a manually operated switch 51 having a first condition as shown in the drawing connecting an input junction 52 of stage 32 to a series resistive-capacitive circuit connected between an output junction 53 of circuit 32 and ground, and a second condition in which junction 52 is connected to a feed-back capacitor 54. The first condition of switch 51 establishes the frequency selective, tunability of stage 32 by connecting input junction 52 to a junction between a capacitor 56 and a resistive network including variable resistor 49. The second condition of switch 51 disables this series resistive-capacitive network of capacitor 56 and resistor 49, and establishes the circuit associated with operational amplifier 48 for straight gain amplification. Capacitor 54 serves to provide "roll-off" attenuation for frequencies in excess of test signals so as to reduce the possibility of oscillations.

Thus, in matching the frequency selectively of receiver unit 16 to the tone generator, the following tuning steps are performed. First, switch 51 is moved to its second condition, sometimes called the "defeat" position, establishing stage 32 as a straight gain amplifier, and variable resistor 47 is adjusted to maximize the audio output of speaker 26 or headset 27. This tunes the first stage 31.

Next, the switch 51 is returned to its normal or first condition, re-establishing the tunability of the second stage 32, and variable resistor 49 is adjusted on the control panel of unit 16 to allow the craftsman to fine tune the system. This results in maximum frequency alignment for optimum sensitivity and selectivity of the receiving means.

The selection of component values for stages 31 and 32 is taught at pages 78 and 79 of "Handbook of Operational Amplifier Active RC Networks" published by Burr-Brown Research Corporation Industrial Airport, Industrial Park, Tucson, Arizona, 1966.

As a further preferred feature of the receiving unit, a threshold circuit means 42 is provided between the output of the tunable amplification stages and the transducer means used to monitor the received tone signals. In certain instances, background signals of the same frequency as the desired tone may be present which tend to obscure the desired test tone signal. Usually, the test tone signal developed by generator 12 will be an interrupted tone, such that it can normally be distinguished from other stray tones of the same frequency. However, this ability to distinguish is not always possible. To improve the reception of the interrupted tone signal during such conditions, threshold circuit means 42 provides for blocking signals unless they exceed a certain threshold level. In this way, uninterrupted signals of the same frequency but of a lower level than the desired test tone can be excluded from the output transducers, so that the craftsman is provided with a clear, uncluttered test frequency tone at the speaker or headset.

In this embodiment, the threshold circuit means 42 is provided by the forward conduction voltage of a diode 57 adapted to be connected in series with the output signal between stage 32 and the amplification stages 43 for the speaker and headset. Furthermore, in this embodiment, switching means are provided, herein the form of a switch 58 for selectively enabling or disabling the threshold circuit means 42. In a first and enabled condition, switch 58 connects the output junction 53 of stage 32 through the forwardly biased diode 57 to an output junction 59 of circuit means 42. Switch 58 is movable to a second condition, in which the threshold effect is disabled, and in which output junction 53 is connected through a resistor 61 to junction 59, bypassing diode 57. Junction 59 is in turn connected by a resistor 62 to the output amplification stages 43 and 44.

Switch 51 for selectively converting stage 32 between a straight gain and a tunable stage, and switch 58 for the threshold enable and disable selection, may both be provided on a front panel of unit 16 as shown in FIG. I for convenient control by the craftsman.

To provide gain control for both the "coiling" procedure, and the "probing" operation, a preferred variable impedance network is provided in conjunction with variable gain amplification stage 33 as shown in FIG. III. Because of the different impedance characteristics of pick-up coil 13, and pick-up probe 14, two different impedance sections are provided for stage 33 in controlling the gain thereof.

In particular, stage 33 includes an operational amplifier 66, having a feed-back network including resistors 67 and 68 and a variable impedance section 69 connecting a junction between resistors 67 and 68 to ground through a multi-positioned gain control switch 71. The variable impedance section 69 provides for adjusting the gain of the receiving amplifier primarily for the function of "probing" and does so while maintaining a desirable high impedance input to stage 33. In general, variable impedance section 69 functions to change the amount of feed-back current associated with operational amplifier 66 and in this manner adjusts the over-all gain of stage 33. Moreover, this is achieved without substantially changing the normal high input impedance to amplifier 66. The first high impedance gain position is provided by position 6 on switch 71 and in this position the feed-back current is established by resistors 67 and 68.

Also associated with stage 33 is another variable impedance section 72 which is connected between the input to stage 33 and ground for changing the input impedance to this stage. This second variable impedance section is employed primarily for "coiling" and introduces a change in input impedance, adjustable by gain control switch 71, which in turn causes a commensurate change in the available amplification gain for signals picked up by coil 13.

Gain control switch 71 may be mounted along with the other controls on a front panel of unit 16 as shown in FIG. I, in which the first five positions provide a variable gain for "coiling", and the sixth through twelfth positions permit different gains for "probing". In some cases the craftsman may find it desirable to employ any one of the 12 available gain positions on switch 71 for "probing", by selecting the position that comes closest to providing the desired output signal level. When "coiling" with a tone source designed for "coiling" (not always readily available), generally the first five switch positions should be used. If the tone can only be detected in the higher gain positions, then the fault resistance is likely to be too high to allow locating by "coiling." However, to locate faults by "coiling" through the use of a tone source primarily designed for "probing", the higher numbered gain settings can be used. The reason for this is that "probing" tone generators develop a considerably lower voltage tone signal than do "coiling" tone sources. By virtue of the present receiver unit 16, it is possible to adapt to the particular tone generator that happens to be available to the craftsman in the field.

With respect to the remaining characteristics of the circuitry illustrated by the present embodiment, input jack 34 may be of a multiple contact type, in which a set of subordinate contacts 73 provide for connecting a battery source 74 to the varous circuit components, only when a probe or coil plug 24 is inserted in the receiving unit. In effect, the power is automatically turned on by insertion of the input jack. A capacitor 76 provides a low impedance path when the battery 74 begins to diminish in voltage.

Capacitor 41 serves to block direct current (DC) and pass the signal tone to the input of gain control stage 33. Resistor 77 provides a time constant for capacitor 41 and also a voltage drop to control the input impedance to the operational amplifier by means of variable impedance section 72. Resistor 78 insures a minimum input impedance for variable impedance section 72, and resistor 79 has a similar function in association with impedance section 69.

Resistor 81 couples the output of stage 33 to the input of stage 31, while resistor 82 serves as a coupling load path between stages 31 and 32.

In stage 31, capacitors 86 and 87, resistor 88 together provide an RC feed back path that can be modified by variable resistor 47, while resistor 89 provides an upper limit to the selectable frequency available at stage 31.

similarly, capacitors 56 and 91, and resistor 92 provide an RC feed back network for stage 32 which can be modified by variable resistor 49, while a resistor 93 provides an upper limit to the selectable frequency of this stage.

Capacitor 54, as indicated functions together with switch 51 to convert stage 32 to a straight gain amplifier, and the value of capcitor 54 may be selected to limit the upper frequencies that can be passed by this stage.

Resistors 96 and 97 of gain amplification stages 43 and 44 serve as feed back resistors in association with operational amplifiers 98 and 99 respectively, while resistor 62 and resistor 101 serve as input impedances to these circuits. The gain of amplification stage 43 may be selected to provide a suitable output voltage to the headset 27 connectable at contacts 102 and 103 of jack receptacle 37. Receptacle 37 is of a multiple contact type in which a set of normally closed subordinate contacts 104, are closed when the headset plug is removed, connecting the output of amplification stages 43 and 44 across speaker 26 as illustrated. Amplification stage 44 is connected so as to provide unity gain, but opposite polarity from the output signal available at junction 106 to in effect double the voltage swing applied across speaker 26. When the headset plug is inserted in receptacle 37, the speaker is disconnected.

Resistor 107 limits the signal level applied to headset 27, while a capacitor 108 is a DC blocking capacitor to protect operational amplifier 98.

The operational amplifiers used in this embodiment of this invention may be provided by conventional integrated circuits.

While only a particular embodiment or embodiments of the present invention have been disclosed herein, it will be readily apparent to persons skilled in the art that numerous changes and modifications may be made to the disclosed appartus without departing from the spirit of the invention. Accordingly, the foregoing disclosure and description thereof are for illustrative purposes only and do not in any way limit the invention which is defined only by the following claims.

I claim:

1. A method for detecting and locating faults and/or identifying conductors in a multiconductor cable comprising the steps of:

connecting one of a plurality of tone generators all having a known nominal frequency but wherein the precise frequency of any given such generator varies from said nominal frequency and is thus unknown to one or more conductors of the cable at a first location thereon;

temporarily coupling a tunable frequency amplifier having a manual adjustment to said tone generator or to a point adjacent the connection of said generator to said cable;

tuning the tunable amplifier by means of said manual adjustment to the precise frequency emitted by said generator;

decoupling the tunable frequency amplifier from said first location; and sensing the presence or absence of the applied tone generator signal on said cable at a location remote from said first location by applying a signal from a pick-up means to said tunable frequency amplifier; and monitoring the amplified output available from said amplifier for the presence or absence of the tone signal at said remote location.

2. The method of claim 1, in which said step of tuning said tunable frequency amplifier comprises the substeps of:

converting a second tunable frequency stage of such amplifier to a straight gain stage;

tuning a first stage of said amplifier to match the frequency produced by said tone generators;

reconverting said second stage to a tunable frequency stage and fine tuning said second stage to the precise frequency of said tone generator.

3. Apparatus for detecting faults and/or locating and identifying conductors of a multi-conductor cable in which a signal generator is used for applying low frequency signals to certain conductors of the cable wherein the precise frequency of such signals is unknown, comprising:

a receiving unit adapted to be connected to a pick-up means for sensing the signal applied to the cable conductors and adapted to be connected to an audio transducer means for producing an audible tone in response to a signal sensed by said pick-up means, said receiver unit having a tunable amplifier means for tuning said receiver to receive and amplify only said preecise frequency produced by said tone generator whereby signals of a different frequency are discriminated against by the receiver unit, and a selectable threshold circuit means connected between said tunable amplifier means and an output of said receiver unit for blocking the passage of amplified signals falling below a certain threshold amplitude level and allowing passage of amplified signals lying above said certain threshold amplitude level whereby weak stray signals of said precise frequency can be rejected to facilitate detection of desired tone signals of greater amplitude.

4. The apparatus of claim 3, wherein said tunable amplifier means comprises:

a first tunable amplification stage and a second tunable amplification stage connected in cascade to provide fine tuning of the precise frequency produced by said tone generator, and switching means and circuit means for selectively converting said second stage between a straight gain amplification stage and a tunable frequency selective stage, whereby said second stage may be disposed in a straight gain amplification condition during tuning of said first tunable stage of said amplifier means.

5. The apparatus of claim 3, said threshold circuit means comprising:

a switching means and a diode, said switching means having a first position connecting said diode between the output of said tunable amplifier means and the output of said receiver unit, and a second condition in which said diode is bypassed, such that said switching means enables said threshold circuit means when said diode is connected in said circuit and disables such circuit when said diode is bypassed.

6. Apparatus for detecting faults and/or locating and identifying conductors of a multi-conductor cable in which a signal generator is used for applying a low frequency signal to certain conductors of the cable wherein the precise frequency of such signal is unknown, comprising:

a receiving unit adapted to be connected to a pick-up mean for sensing the signal applied to the cable conductors and adapted to be connected to an audio transducer means for producing an audible tone in response to a signal sensed by said pick-up means, said receiver unit having a tunable amplifier means for tuning said receiver unit to receive and amplify only the precise frequency produced by said tone generator whereby signals of a different frequency are discriminated against by the receiver unit, said receiver unit having a gain control stage including first and second variable impedance sections and an amplifier having a feed-back circuit connected therearound, said first impedance section connected to vary the amount of current flow in said feed-back around said amplifier so as to cause a commensurate change in the signal gain provided thereby while maintaining a relatively high input impedance to said gain control stage for certain types of probing operations, and said gain control stage having a second impedance section connected to vary the input impedance to said amplifier causing a commensurate change in the effective gain thereof but also causing a decrease in the input impedance for lower gain settings, whereby the relatively high impedance variable gain control provided by said first impedance section is suitable for use in "probing" operations whereas the second impedance section is suitable primarily for "coiling" operations.

7. Apparatus for locating faults and identifying conductors of a multi-conductor telephone cable comprising:

a tone generator for connection to certain conductors of said cable at a first location therealong, in which the precise signal frequency developed by said generator is unknown or is subject to variation;

a receiver unit having a manually adjustable frequency tunable amplifier for being initially disposed proximate said generator and manually tuned to the precise frequency produced by said tone generator, said receiver unit having an input adapted to receive a signal from a pick-up means scanning said cable at a remote location from said generator and having an output adapted to be connected to a transducer means for audibly registering an amplified tone signal applied to the receiver unit input;

said frequency tunable amplifier of said receiver unit comprising:

first and second frequency tunable cascaded stages, said first stage providing relatively coarse tuning at the output thereof, and said second stage providing relatively finer tuning at the output thereof by virtue of the frequency selectivity of both said stages, switching means and circuit means for selectively converting said second stage between straight gain amplification and tunable frequency selective amplification, whereby said first stage may be tuned while said second stage is in its straight gain amplification condition, and thereafter said second stage may be tuned while in its tunable frequency selective condition.

* * * * *